United States Patent
Bartels et al.

(10) Patent No.: US 6,948,091 B2
(45) Date of Patent: Sep. 20, 2005

(54) HIGH INTEGRITY RECOVERY FROM MULTI-BIT DATA FAILURES

(75) Inventors: Michael W. Bartels, Phoenix, AZ (US); Nicholas J. Wilt, Glendale, AZ (US); Scott L. Gray, Peoria, AZ (US)

(73) Assignee: Honeywell International Inc., Morristown, NJ (US)

(*) Notice: Subject to any disclaimer, the term of this patent is extended or adjusted under 35 U.S.C. 154(b) by 529 days.

(21) Appl. No.: 10/137,569

(22) Filed: May 2, 2002

(65) Prior Publication Data

US 2003/0208704 A1 Nov. 6, 2003

(51) Int. Cl.[7] .................................................. G06F 11/00
(52) U.S. Cl. ............................................ 714/11; 714/6
(58) Field of Search ........................... 714/11, 6, 12–13, 714/2, 48, 764–767, 42, 45; 711/115, 153, 162, 173

(56) References Cited

U.S. PATENT DOCUMENTS

| | | | | |
|---|---|---|---|---|
| 4,358,823 A | * | 11/1982 | McDonald et al. | 714/11 |
| 4,617,664 A | * | 10/1986 | Aichelmann et al. | 714/758 |
| 5,086,429 A | | 2/1992 | Gray et al. | |
| 5,757,642 A | * | 5/1998 | Jones | 700/5 |
| 5,812,757 A | * | 9/1998 | Okamoto et al. | 714/11 |
| 5,909,541 A | | 6/1999 | Sampson et al. | |
| 2003/0046628 A1 | * | 3/2003 | Rankin et al. | 714/752 |

* cited by examiner

Primary Examiner—Dieu-Minh Le

(57) ABSTRACT

Methods and system for facilitating a computing platform to recover quickly from transient multi-bit data failures within a run-time data memory array in a manner that is transparent to software applications executing on the computing platform. A fault-tolerant digital computing system is provided for that utilizes parallel processing lanes in a lockstep architecture. Each processing lane includes error detectors that are configured to detect multi-bit data errors in each processing lane's memory arrays. Upon detection of a multi-bit data failure, an interrupt is generated wherein control logic software responds to the interrupt and corrects the data errors in the memory array of each processing lane.

15 Claims, 2 Drawing Sheets

HIGH INTEGRITY RECOVERY FROM MULTI-BIT DATA FAILURES

BACKGROUND OF THE INVENTION

1. Technical Field

The present invention generally relates to fault-tolerant digital computing systems. More specifically, the present invention relates to a system for quickly recovering from transient multi-bit data failures within a run-time memory array.

2. Background Information

Some digital computing system applications require a high degree of safety. For example, an aircraft flight control computer for safe operation depends upon continuous error-free computing operation for the entire period of flight. It should be recognized that error-free operation requires the elimination of, or containment of faults within the digital computing system. For many aircraft applications, the probability of an undetected failure must be less than $10^{-9}$ per flight hour. In addition to ever-increasing demands of reliability, a fast computing system with increased throughput is necessary for flight control.

A malfunction of any single component in a conventional computing system will result in an unsafe error. This is known as a series reliability model, wherein the probability of an unsafe error is the sum of the probability of the malfunction of each component. A system corresponding to this model is sometimes referred to as a "single thread system." In prior art computing systems, a single-thread memory system complimented with an off-the-shelf error detection and correction linear block code has been utilized to attempt to meet required failure probability levels. However, such a method does not satisfy required safety levels or processing throughput requirements.

It is the goal of fault tolerant computing systems to provide the greatest possible reliability with the most cost effective approach. In some instances, redundancy actually undercuts the reliability improvements being sought by the added redundancy. Reliability improvement can be directed toward improving the availability of the system, i.e., the percentage of time the system is available to do useful work, or the safety of the system, i.e., the probability that the system will perform error-free for a specified mission time. U.S. Pat. No. 5,086,429 to Gray, et al., issued Feb. 4, 1992 and presently assigned to the assignee hereof, shows a computing system in which error correction capability is sacrificed, decreasing availability, in order to achieve a higher degree of safety.

U.S. Pat. No. 5,086,429 describes a fail-operative, fail-passive, fault tolerant computing system, which includes a first and second pair of substantially identical processors connected to a system bus with one pair being arbitrarily designated as the "active" pair while the other is designated as a "hot stand-by" pair. Each processor is operated in locked step fashion. Rather than providing individual memory arrays for each processor in each pair, the two processors in each pair share a common memory. A bus module examines the binary data and address transmissions carried by data buses and address buses for the active pair to determine whether discrepancy exists in the information being simultaneously transferred over the address and data buses for that pair of processors. The standby pair is likewise configured.

Error detection logic, including a linear block code generator, operates during writes to memory by the processor so as to encode the datawords that are to be written to memory, creating a series of checkbits associated therewith. The datawords along with the checkbits are stored in the memory as a linear block codeword. During a read initiated by the processors, an appropriate codeword is addressed by the processors and read from the memory. The checkbits of the codeword are examined for correctness by a set of syndrome generators, one associated with each processor; the syndrome generators determining whether an error exists in the codeword read from memory. When such an error is detected, a signal is sent to bus monitor logic to cause a switchover such that the designated standby pair becomes the active pair. The faulted pair will record the fault and may either remain faulted, or in the case of a transient or soft fault become the stand-by pair.

It is well known in the prior art to employ a linear block code, also known as an [n,k] code, comprised of a set of n binary digits wherein any subset of k binary digits represent the data portion of the code and the remaining binary digits, n–k, represent binary digits of the code which may be used for error detection and/or error correction. A specific instance of a given code is commonly called a "codeword." For example, a 9,8 code (8 data bits and 1 error checkbit) can generate 512 unique 9-bit codewords. A 9,8 code provides a simple parity check of an 8-bit dataword which is capable of detecting a single bit error but would miss the detection of an even number of bits in error and provide no capability to correct errors. As the number of checkbits is increased, the capability of the code to detect and/or correct random errors improves because as the number of checkbits increases the fraction of all possible codewords which are valid codewords, decreases, thus increasing the probability that a given error will result in an invalid codeword being detectable.

Hamming weight of a given linear block code is the measure of its error detecting capability, i.e., the Hamming weight is the maximum number of binary digits a given dataword may be in error while still assuring error detection by utilization of the linear block code. When the number of binary digits in error exceeds the Hamming weight, there is the possibility that the error in excess will transfer the codeword into a valid and therefore undetectable codeword. The logical properties of the linear block code generator, usually expressed in the form of a code matrix, and commonly referred to in the art as the H matrix, determines the specific error detection/error correction capabilities of the code.

U.S. Pat. No. 5,909,541 to Sampson, et al., issued Jun. 1, 1999 and presently assigned to the assignee hereof, shows a computing system utilizing linear block codes that corrects single bit data failures. U.S. Pat. No. 5,909,541 describes a computer system that combines the redundant memory arrays of a traditional two-lane locked step, fail-passive processing pair into a shared memory array. Each lane of the locked step system includes an error detection and correction module for detecting and/or correcting single bit errors. An error detection and correction optimized linear block code is leveraged over multiple datawords.

However, these prior art systems are unable to correct multi-bit data failures. As the geometry sizes of computer system components has been decreasing and the amount of memory has been increasing, the probability of a multi-bit data failure within a memory array has increased. In addition, those computer systems that operate at high altitudes, such as computer systems in air vehicles, are especially susceptible to single event upsets (SEUs). For example, a SEU can be triggered by secondary and tertiary particles generated from cosmic radiation which can cause changes in the data leading to multi-bit data failures.

Thus there exists a need for a computing system utilizing linear block codes that is able to detect and correct transient multi-bit data failures and which meets ever increasing speed and reliability requirements with reduced redundancy and improved throughput.

BRIEF SUMMARY OF THE INVENTION

The present invention provides a system for a computing platform to quickly recover from transient multi-bit data failures within a run-time memory array in a manner that is transparent to software applications that are running on the computing platform. In accordance with one aspect of the present invention, a fault-tolerant computer system is provided for that comprises a first processing lane and a second processing lane. Each processing lane includes a processor and redundant memory arrays. In addition, each processing lane includes an error detector and comparator that are configured to detect errors in the data stored in the memory arrays. The error detector and comparator may generate an interrupt upon detection of an error in the data of one of the memory arrays. Upon detection of an error for the data in one of the memory arrays, a control logic module utilizes the error-free data in the other memory array to correct the data error.

In addition, the present invention provides for a high integrity method that is used to detect and correct multi-bit data failures in data. The method provides for generating a first copy of the data at a first processor and a second copy of the data at a second processor. The first copy of the data is provided to a first error detector and the second copy of the data is provided to a second error detector. The method also provides for performing a bit-by-bit comparison of the first and second copies of the data. If a multi-bit data fault is detected with the first or second copy of the data, then an interrupt is provided to both the first and second processors, and the fault-free copy of the data is used to correct the first or second copy of the data.

BRIEF DESCRIPTION OF THE SEVERAL VIEWS OF THE DRAWINGS

A more complete understanding of the present invention may be derived by referring to the detailed description when considered in connection with the Figures, where like reference numbers refer to similar elements throughout the Figures, and.

DETAILED DESCRIPTION OF PREFERRED EXEMPLARY EMBODIMENTS

The present invention may be described herein in terms of functional block components and processing steps. Such functional blocks may be realized by any number of hardware or software components configured to perform the specified functions. For example, a system according to various aspects of the present invention may be implemented with a variety of different combinations of hardware and software components, e.g., one embodiment may utilize hardware components to detect errors in data and software components to correct the data errors, while other embodiments may utilize all hardware components to detect and correct errors in the data. Furthermore, the present invention is not limited to the process flows described herein, as any system, process flow, or rearrangement of process steps which captures one or more of the features of the present invention is within the scope of the present invention. Any number of conventional techniques for processing steps, such as the bit-by-bit comparison of data, the setting of status flags, and the like, may be employed. The particular implementations and processes shown and described herein are illustrative of the present invention and its best mode and are not intended to otherwise limit the scope of the present invention in any way. Indeed, for the sake of brevity, conventional object-oriented programming and other software programming techniques may not be described in detail herein.

A system according to various aspects of the present invention may be configured to detect and correct data errors in a computer system that may be used in a variety of different types of applications. For example, the computer system may be used on board an aircraft, on a ship at sea, in a hospital, and the like. The computer system of the present invention is particularly well suited for applications where the computer data may be corrupted by environmental conditions or other factors, and where it is desired for the computer system to detect and automatically correct corrupted computer data without user intervention.

Figure 1:
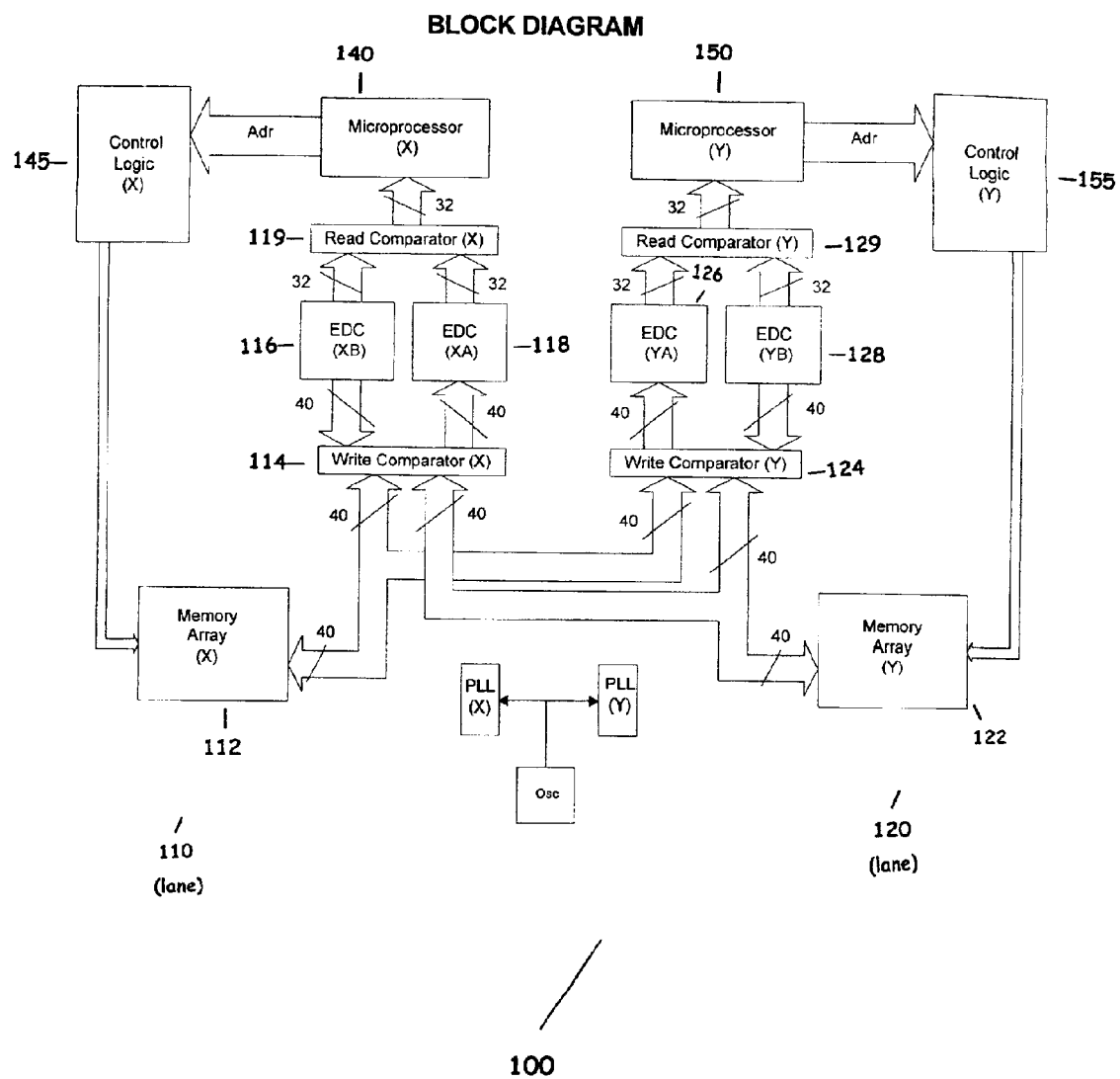
FIG. 1 illustrates a schematic diagram of an exemplary computing system in accordance with the present invention.

Referring to FIG. 1, a fault-tolerant digital computing system 100 according to various aspects of the present invention for detecting and correcting multi-bit data errors comprises a first processing lane 110 and a second processing lane 120. As illustrated, digital computing system 100 utilizes a two-lane, locked step processing system. While the digital computing system 100 illustrated in FIG. 1 utilizes a two-lane, locked step architecture, it will be appreciated that this represents just one embodiment of the present invention and that alternate embodiments may utilize more than two lanes in a locked step system architecture. Such alternate embodiments are within the scope of the present invention, however, the present invention is conveniently described in detail in the context of a two-lane, locked step processing system.

Digital computing system 100 is a dual redundant lane system that includes two processing lanes 110 and 120. As will be described in detail, first processing lane 110 and second processing lane 120 are suitably configured to take advantage of the redundant memory array arrangement and the lane-to-lane cross-compare feature of their lockstep architecture. First processing lane 110 includes a memory array 112, a write comparator 114, error detection and correction (EDC) components 116 and 118, read comparator 119, microprocessor 140, and control logic component 145. Similarly, second processing lane 120 includes a memory array 122, a write comparator 124, error detection and correction components 126 and 128, read comparator 129, microprocessor 150, and control logic component 155.

Processor 140 is connected to read comparator 119 by a bi-directional data bus and processor 140 is also connected to control logic component 145 by an address-control bus. The data bus may be a 32-bit data bus that is capable of transferring 32 bits of data at one time. However, the data bus may be any other size data bus that is capable of transferring a plurality of data bits (e.g., 16 bits or 64 bits). The address-control bus may be any suitable bus that is capable of transferring memory addresses and processor control signals for processing by control logic component 145. Similarly, processor 150 is connected to read comparator 129 by a data bus and to control logic component 155 by an address-control bus. Processors 140 and 150 may comprise any of a variety of commercially available processors such as AMD 29K, Power PC, x86 type processors, and the like. Control logic component 145 is also connected to memory array 112 and control logic component 155 is connected to memory array 122. The control logic components are connected to the memory arrays by a suitable address-control bus Control logic components 145 and 155 will be described in detail further below with reference to FIGS. 1 and 2.

In accordance with one embodiment of the present invention, digital computing system 100 utilizes a [40, 32] linear block code to achieve a multi-bit error detection and correction. The [40, 32] linear block uses a 40-bit codeword, where 32 bits are databits and the remaining 8 bits are checkbits generated by the EDC components of the dual lane system. Each 40-bit codeword read from memory arrays 112 and 122 includes a 32-bit dataword. The linear block code is used to detect an error in any of the bits of the 40-bit codeword. In alternate embodiments of the present invention, it will be appreciated that alternate size codewords may be utilized that have a different number of bits. For example, an [80, 64] linear block code could be used where 64 bits are databits and the remaining 16 bits are checkbits.

Each redundant memory array 112 and 122 is connected to write comparators 114 and 124 by a suitable data bus, such as a 40-bit bi-directional data bus which accommodates 40-bit codewords. The cross connection of memory arrays 112 and 122 to each of the write comparators 114 and 124 allows for each processing lane to evaluate data from each of the memory arrays, and further allows each processing lane to have access to data from the memory array of the other processing lane as will be described in further detail below. It will be appreciated that this cross connection configuration allows each processing lane to independently evaluate data from each memory array, and thus to detect and correct data as will be described in further detail below. In addition, each memory array 112 and 122 comprises one or more memory devices that are used to store data.

Write comparator 114 is connected to EDC components 116 and 118 by separate data buses, such as a 40-bit data bus that can accommodate 40-bit codewords. The data busses are unidirectional with one data bus flowing from write comparator 114 to EDC component 118 and the other data bus flowing from EDC component 116 to write comparator 114.

Similarly, write comparator 124 is connected by separate unidirectional data buses to EDC components 126 and 128. One data bus provides data from write comparator 124 to EDC component 126 and the other data bus provides data from EDC component 128 to write comparator 124.

EDC components 116 and 118 are connected to read comparator 119 by a suitable data bus, such as a 32-bit data bus that can accommodate a 32-bit dataword. Similarly, EDC components 126 and 128 are connected to read comparator 129 by a suitable data bus, such as a 32-bit data bus that can accommodate 32-bit datawords.

In accordance with one aspect of the present invention, an error detection and correction linear block, such as a Hamming code can be used. The EDC components utilize the error detection and correction linear block with the minimum properties of detecting and correcting all single bit faults within a data word. After the EDC components process and correct any single bit faults within a data word, the comparators in each processing lane perform a bit-by-bit comparison of the redundant memory array's contents. That is, the comparators take advantage of the lockstep architecture and perform a lane-to-lane cross-comparison of the data in the redundant memory array's contents.

Figure 2:
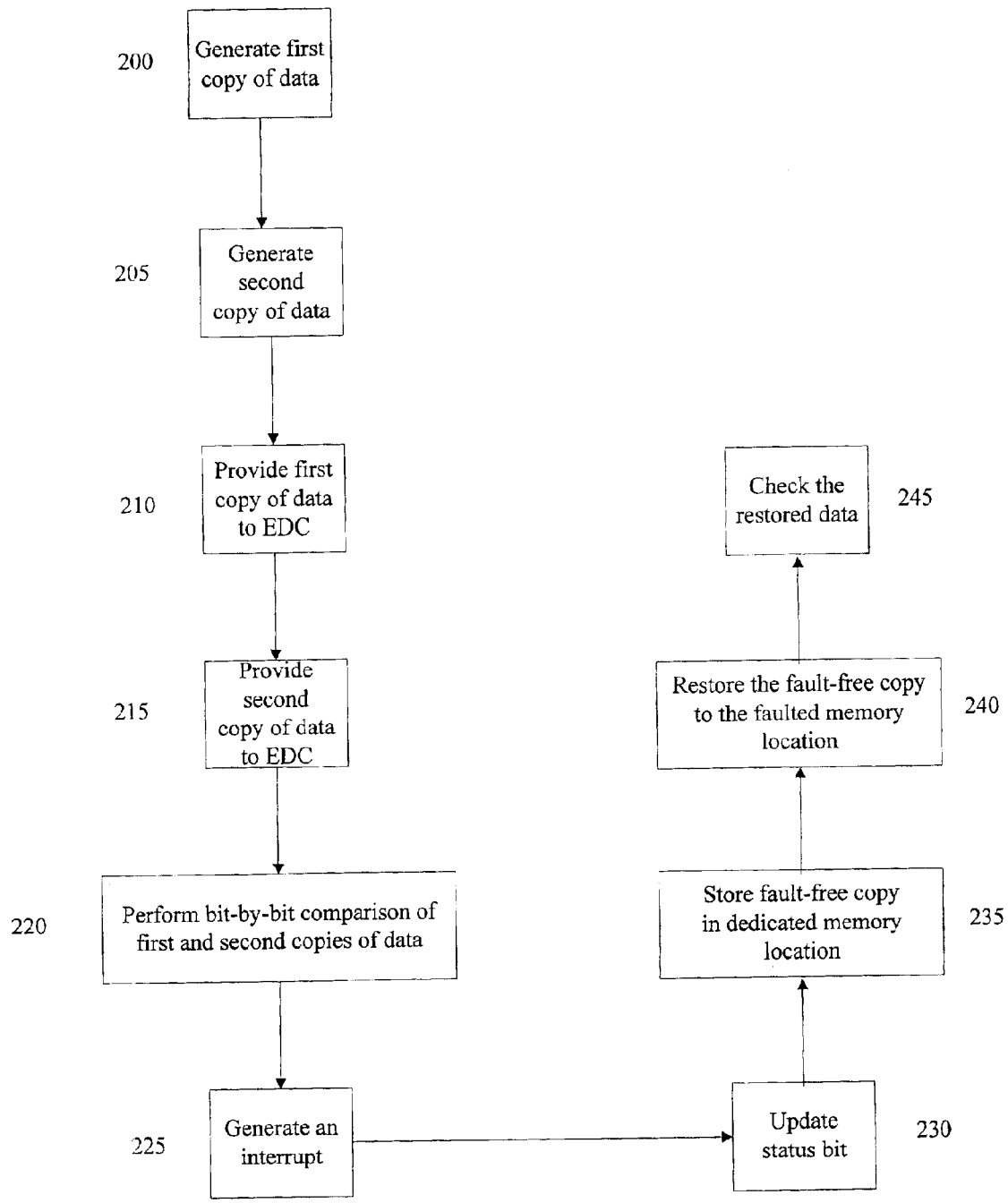
FIG. 2 illustrates a flow chart setting forth the operation of certain aspects of the present invention.

Referring now to FIG. 2, an exemplary error detection and correction method in accordance with one embodiment of the present invention will now be described. Data is retrieved from each of the memory arrays such that a first and second copy of the data is generated (steps 200 and 205). The first copy of the data is provided to a first EDC component (210) and a second copy of the data is provided to a second EDC component (215). Each EDC component and its associated comparator perform a bit-by-bit comparison of the first and second copies of the data (220). When an EDC component and its associated comparator detect a multi-bit data fault with one processing lane's (110 or 120) data image, then the EDC component (or alternatively, its associated comparator) generate an interrupt (225). The EDC component (or alternatively, its associated comparator) may be further configured to only generate an interrupt when the bit-by-bit comparison fails, and one copy of the data in one of the redundant memory arrays is fault free or includes correctable single-bit data errors. In addition, the EDC component may update a status bit in one of the EDC registers to indicate that a multi-bit data fault has occurred (230). The EDC component stores a fault-free copy of the data in a dedicated register of the EDC component (235). The fault-free copy of the data may be obtained from the other processing lane as the EDC component has access to the data in the memory arrays of each processing lane. It will be appreciated that the EDC components and their associated comparators can detect any combination of bit failures within a single data word. In this manner, the present invention provides for the ability to detect and correct any combination of bit failure within a single EDC covered 32-bit (or any other size that may be used) data word.

The EDC component in the opposite processing lane will also detect the multi-bit data fault, as the opposite lane's EDC component also has access to the same faulted data. Therefore, both processing lanes will assert an interrupt in its processing lane such that core software is aware of the multi-bit data fault. Core software (i.e., control logic component) will correct the memory location in the following manner.

The memory address of the faulty memory location is latched within the microprocessor with the assertion of the interrupt (230). Alternatively, the control logic components could latch the faulty address. In addition, the fault-free copy of the data is stored in a dedicated register of each processing lane's EDC component (235). The control logic component reads the fault-free copy of the data from the dedicated register and then writes the fault-free data to the faulted memory location while in lockstep (240). The data at the replaced memory location is then read and checked by performing a bit-by-bit comparison of the restored data (245). This additional check by the EDC component is used to confirm that the update occurred and that there are not any hardware faults with the faulted memory location. In accordance with one aspect of the present invention, the faulted memory location may be read with the EDC in detect/only mode. If another data fault is detected while performing any of the replacement steps, then the replaced memory location is considered invalid and cannot be used. In addition, the fault-free data may be written to both redundant memory arrays, and not just to the memory array containing the faulted data. Because this recovery implementation fully validates the hardware prior to returning to normal execution, a strike counter on replacement frequency is not necessary.

It will be appreciated that the present invention provides for a recovery implementation that is transparent to software applications running on computing system 100. Multi-bit data failures are detected and corrected without the need to notify software applications running on the computer system. Stated another way, since the data failure detection and corrected is performed by the core software, there is no need to notify users of the computing system that there has been a data error and corresponding data correction.

Various aspects of the present invention have been described with reference to exemplary embodiments. However, changes and modifications may be made to the disclosed embodiments without departing from the scope of the present invention. For example, the various processing steps of detecting and correcting data errors may be implemented in alternate ways depending upon the particular application or in consideration of any number of cost functions associated with the operation of the system. These and other changes or modifications are intended to be included within the scope of the present invention.

What is claimed is:

1. A fault-tolerant digital computing system comprising:
   a processor;
   a first memory array and a second memory array, wherein each memory array is configured to store data across one or more memory devices;
   a databus coupling the processor to each of the memory arrays; an error detector connected to the processor and the memory arrays on the databus for receiving the data from one of the memory arrays;
   a comparator connected to the error detector, the comparator configured to compare each bit of the data from one of the memory arrays to each bit of the corresponding data from the other memory array; and
   a control logic module connected to the processor and the memory arrays on the databus, the control logic module configured to correct any errors in the data.

2. The system according to claim 1, wherein the error detector is further configured to provide an interrupt to the processor and the control logic module is further configured to respond to the interrupt and correct any errors in the data.

3. The system according to claim 1 wherein the comparator is further configured to provide an interrupt to the processor and the control logic module is further configured to respond to the interrupt and correct any errors in the data.

4. The system according to claim 1 wherein each memory may is configured to store at least one linear block codeword across one or more memory devices, wherein the codeword includes a dataword and a plurality of checkbits associated therewith.

5. The system according to claim 1 further comprising a plurality of redundant memory arrays.

6. A method of detecting and correcting multi-bit data failures in data for a fault-tolerant digital computer system, comprising the steps of:
   generating a first copy of the data at a first processor;
   providing the first copy of the data to a first error detector;
   generating a second copy of the data at a second processor;
   providing the second copy of the data to a second error detector;
   performing a bit-by-bit cross comparison of the first and second copies of the data; detecting a multi-bit data fault with the first or second copy of the data;
   providing an interrupt to each of the first and second processors;
   storing a fault-free copy of the data in a dedicated memory location,
   wherein the fault-free copy is created from the first or second copy of the data; and correcting, in response to the interrupt, the first or second copy of the data using the fault-free data copy.

7. The method according to claim 6, further comprising the step of updating a status bit in a register.

8. The method according to claim 6, further comprising the steps of: generating a first set of checkbits at the first error detector based upon the first copy of the data; and generating a second set of checkbits at the second error detector based upon the second copy of the data.

9. The method according to claim 8, further comprising the steps of: using the first set of checkbits to detect and correct single bit errors in the first copy of the data; and using the second set of checkbits to detect and correct single bit errors in the second copy of the data.

10. A system for detecting and correcting multi-bit data failures in data, the system having a first processing lane and a second processing lane, the system comprising:
    a first processor associated with the first processing lane;
    a second processor associated with the second processing lane;

a first memory array connected to the first processor on a databus, the first memory array configured to store a first copy of the data;

a second memory array connected to the second processor on the databus, the second memory array configured to store a second copy of the data;

a first error detector connected to the first processor and to the first and second memory arrays on the databus for receiving the first and second copies of the data;

a second error detector connected to the second processor and to the first and second memory arrays on the databus for receiving the first and second copy of the data;

a first comparator connected to the first error detector, the first comparator configured to compare each bit of the first copy of the data to each bit of the second copy of the data;

a second comparator connected to the second error detector, the second comparator configured to compare each bit of the second copy of the data to each bit of the first copy of the data;

a first control logic module connected to the first processor and to the first memory array on the databus, the first control logic module configured to correct any errors in the first copy of the data; and a second control logic module connected to the second processor and to the second memory array on the databus, the second control logic module configured to correct any errors in the second copy of the data.

11. The system according to claim 10, wherein the first error detector is further configured to provide an interrupt to each of the first and second processors and the first control logic module is further configured to respond to the interrupt and correct any errors in the first copy of the data.

12. The system according to claim 10, wherein the second error detector is further configured to provide an interrupt to each of the first and second processors and the second control logic module is further configured to respond to the interrupt and correct any errors in the second copy of the data.

13. The system according to claim 10, wherein the first comparator is further configured to provide an interrupt to each of the first and second processors and the first control logic module is further configured to respond to the interrupt and correct any errors in the first copy of the data.

14. The system according to claim 10, wherein the second comparator is further configured to provide an interrupt to each of the first and second processors and the second control logic module is further configured to respond to the interrupt and correct any errors in the second copy of the data.

15. The system according to claim 10, wherein each memory array is configured to store at least one linear block codeword across one or more memory devices, wherein the codeword includes a dataword and a plurality of checkbits associated therewith.

* * * * *

UNITED STATES PATENT AND TRADEMARK OFFICE
CERTIFICATE OF CORRECTION

PATENT NO. : 6,948,091 B2
APPLICATION NO. : 10/137569
DATED : September 20, 2005
INVENTOR(S) : Bartels et al.

It is certified that error appears in the above-identified patent and that said Letters Patent is hereby corrected as shown below:

In column 8, line 20, delete "may" and insert --array--

Signed and Sealed this

Twenty-seventh Day of March, 2007

JON W. DUDAS
*Director of the United States Patent and Trademark Office*